United States Patent [19]

Adachi

[11] Patent Number: 4,958,967
[45] Date of Patent: Sep. 25, 1990

[54] SPINDLE FEED MECHANISM FOR A MACHINE TOOL

[75] Inventor: Sakashi Adachi, Numazu, Japan

[73] Assignee: Toshiba Kikai Kabushiki Kaisha, Tokyo, Japan

[21] Appl. No.: 406,613

[22] Filed: Sep. 12, 1989

[30] Foreign Application Priority Data

Sep. 22, 1988 [JP] Japan ................... 63-237922

[51] Int. Cl.⁵ .................. B23C 1/06; B23B 39/00
[52] U.S. Cl. .................. 409/185; 408/129; 408/137; 409/231
[58] Field of Search ............ 409/183, 235, 190, 231, 409/185, 218; 408/129, 137, 138, 234, 130, 239 R, 239 A, 135

[56] References Cited

U.S. PATENT DOCUMENTS

| | | | |
|---|---|---|---|
| 2,851,826 | 9/1958 | Chuet | 409/183 X |
| 4,088,417 | 5/1978 | Kosmowski | 408/137 |
| 4,242,019 | 12/1980 | Roch | 409/185 |
| 4,358,228 | 11/1982 | Stark | 408/129 |
| 4,594,035 | 6/1986 | Hoyss et al. | 408/234 |

FOREIGN PATENT DOCUMENTS

| | | |
|---|---|---|
| 59-107805 | 6/1984 | Japan. |
| 62-36822 | 8/1987 | Japan. |
| 1154061 | 5/1985 | U.S.S.R. ................. 408/234 |

OTHER PUBLICATIONS

Koenigsberger, "Design Principles of Metal-Cutting Machine Tools", 1964, p. 285.

Primary Examiner—William Briggs
Attorney, Agent, or Firm—Cushman, Darby & Cushman

[57] ABSTRACT

A spindlehead for a horizontal boring machine is disclosed. Included is a spindle sleeve mounted to a spindlehead casing for axial displacement out of and into the casing. A spindle is rotatably mounted within the spindle sleeve for joint axial displacement therewith. A spindle drive motor is geared to the spindle in order to drive the same for required boring or like operation. Another motor is employed for feeding the spindle into work along with the spindle sleeve and the spindle drive motor. Being fed with the spindle sleeve, the spindle is thereby rigidly supported even when extended out of the casing.

4 Claims, 1 Drawing Sheet

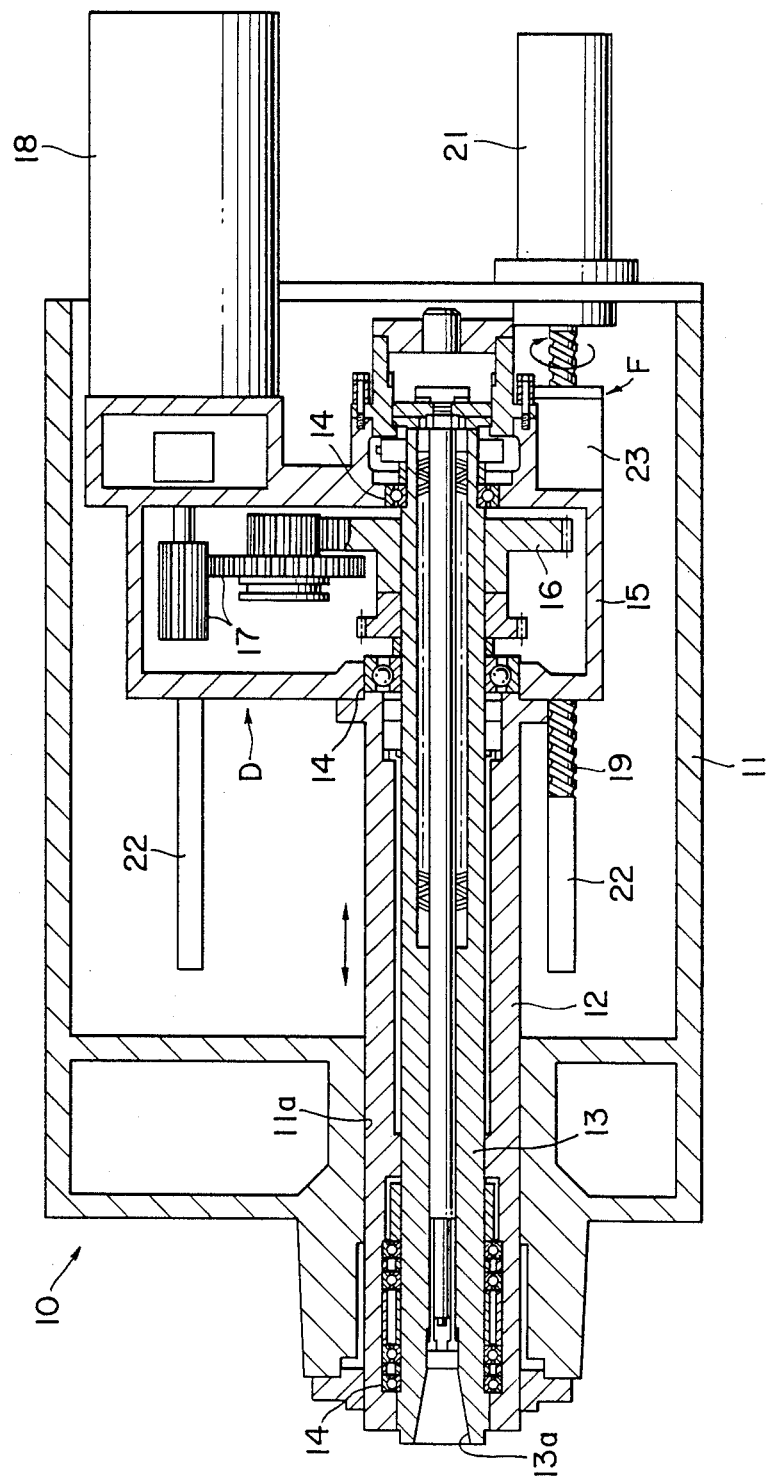

SPINDLE FEED MECHANISM FOR A MACHINE TOOL

BACKGROUND OF THE INVENTION

This invention relates generally to machine tools, and particularly to those of the type having a spindle to which various cutting tools, arbors and other attachments may be interchangeably mounted. More particularly, the invention pertains to a spindlehead featuring a mechanism for feeding the spindle against work. The spindlehead according to the invention is well suited for use in boring machines, although no unnecessary limitations thereto are intended.

The spindle of boring machines is fed longitudinally out of the spindlehead against work. Take, for example, a horizontal boring and milling machine for a study of the conventional spindle feed mechanism. The boring spindle has been received within a hollow milling spindle and keyed or splined thereto for axial sliding movement relative to the same. A feed mechanism such as that comprising a hydraulic actuator or a feed screw has been coupled to the boring spindle for axially driving the same with respect to the milling spindle. The milling spindle has been revolved as by a gear train coupled to a drive motor for the boring spindle.

Thus, according to the prior art, the boring spindle has been fed out of the milling spindle during machining. It will therefore be understood that the boring spindle has been supported essentially in a cantilever fashion when extended out of the milling spindle. Such cantilever support of the boring spindle is of course objectionable because it is subjected to greater bending stresses from the cutting tool mounted to its distal end, during machining. The results have been the easy deflection of the boring spindle under load and the consequent vibration of the cutting tool. The boring spindle has been easy to deflect under its own weight, too, so that limitations have been imposed on the size and weight of cutting tools and attachments that can be mounted to the spindle.

An additional inconvenience has manifested itself from the fact that, being slidable axially with respect to the milling spindle, the boring spindle has been free to undergo axial deformation. As heat develops during machining, the boring spindle has been susceptible to thermal deflection, adversely affecting the accuracy of machining.

SUMMARY OF THE INVENTION

The present invention provides a simple and readily practicable solution to the problem of how to feed the spindle of a boring machine or the like without giving rise to a decrease in the accuracy or efficiency of machining when the spindle is extended out of the spindlehead.

Briefly, the invention may be summarized as a spindlehead for a machine tool such as a boring machine, comprising a spindle sleeve mounted to a spindlehead casing for reciprocating movement out of and into the casing along a linear guideway defined thereby. A spindle is rotatably mounted within the spindle sleeve and restrained from axial displacement relative to the same, so that the spindle travels axially out of and into the casing with the spindle sleeve. Coupled to the spindle for imparting rotation thereto with respect to the spindle sleeve, spindle drive means is capable of joint reciprocating movement with the spindle and the spindle sleeve relative to the casing. Feed means is mounted to the casing for linearly reciprocating the spindle and the spindle sleeve and the spindle drive means relative to the casing.

Thus, rotatably mounted within the spindle sleeve via suitable bearing means, the spindle can be thereby constrained to joint axial displacement with the spindle sleeve relative to the spindlehead casing. The spindle is therefore rigidly supported by the spindle sleeve regardless of its axial position with respect to the spindlehead casing. So supported, the spindle is practically free from deflection or vibration under load even when fully extended out of the spindlehead casing. No significant decrease in the accuracy or efficiency of machining is to occur in the extended position of the spindle.

It will also be appreciated that the bearing means rotatably supporting the spindle within the spindlehead serve the additional purpose of locking the spindle against axial deformation. Consequently, the spindle is not to suffer thermal deflection during machining.

The above and other features and advantages of this invention and the manner of realizing them will become more apparent, and the invention itself will best be understood, from a study of the following description and appended claims, with reference had to the attached drawing showing a preferred embodiment of the invention.

BRIEF DESCRIPTION OF THE DRAWING

The accompanying drawing illustrates in axial section a spindlehead for a horizontal boring machine constructed in accordance with the invention.

DESCRIPTION OF THE PREFERRED EMBODIMENT

The illustrated spindlehead, generally designated 10, has a casing 11 which is to be mounted fast to the familiar column, not shown, of a machine tool such as a boring machine. The spindlehead casing 11 houses various working parts and components to be set forth hereafter. Additionally, the casing 11 serves the purpose of defining a horizontal guideway herein shown as a guide hole 11a. The guide hole 11a is open forwardly or leftwardly, as viewed in the drawing, of the spindlehead casing 11.

Slidably mounted in the guide hole 11a is a spindle sleeve 12 capable of axial displacement relative to the spindlehead casing 11. The drawing shows the spindle sleeve 12 fully received within the casing 11, but the spindle sleeve partly projects out of the guide hole 11a even when in this fully contracted position. The spindle sleeve 12 has a spindle 13 coaxially and rotatably nested therein via two or more radial bearings 14. In its front end the spindle 13 has a tapered hole 13a, as is conventional in the art, into which may be inserted cutting tools, arbors for other cutting tools, or other attachments.

It will be seen that the bearings 14 are disposed at or adjacent the opposite axial ends of the spindle sleeve 12. Therefore, while permitting the rotation of the spindle 13, the spindle sleeve 12 rigidly protects the spindle from bending stresses. The bearings 14 perform the additional function of locking the spindle 13 against axial displacement relative to the spindle sleeve 12.

The spindle 13 is provided with a spindle drive mechanism D including a gearbox 15 rotatably mounted on a rearward extension, projecting out of the spindle sleeve 12, of the spindle via the bearings 14. A spindle drive motor 18 is mounted to and supported by the gearbox 15. Housed in the gearbox 15, a gear train 17 transmits the rotation of the spindle drive motor 18 to one or more driven gears 16 on the rearward extension of the spindle 13.

The gearbox 15 is secured to the rear end of the spindle sleeve 12. Accordingly, the complete spindle drive mechanism D is capable of joint linear reciprocating movement with the spindle sleeve 12, and therefore with the spindle 13, relative to the spindlehead casing 11. A plurality of, two shown, guide rails 22 are fixedly mounted within the spindlehead casing 11 for guiding such linear travel of the gearbox 15 along the axis of the spindle 13 and the spindle sleeve 12.

The spindlehead 10 further comprises a feed mechanism F for feeding the spindle 13 in its axial direction together with the spindle sleeve 12 and the spindle drive mechanism D. The feed mechanism F includes a feed motor 21, preferably a servomotor, mounted fast to the spindlehead casing 11. The rotation of the feed motor 21 may be translated into the axial movement of the spindle 13 by any suitable precision motion-translating means herein shown as a screw-and-ball-nut arrangement. Thus the feed motor 21 is drivingly coupled directly to a ball screw 19 extending parallel to the axis of the spindle 13. Secured to the gearbox 15 of the spindle drive mechanism D, a ball nut 23 is engaged with the screw 19.

In operation, the spindle drive motor 18 may be set into rotation for revolving the spindle 13. As the gear train 17 transmits the rotation of the spindle drive motor 18 to the spindle 13, the latter will rotate within the spindle sleeve 12 together with the unshown cutting tool or the like inserted in its tapered hole 13a.

For feeding the spindle 13 out of the spindlehead casing 11, the feed motor 21 may be set into rotation. The resulting rotation of the screw 19 will be translated by the ball nut 23 into the linear travel of the gearbox 15 along the guide rails 22 and, in consequence, of the spindle sleeve 12 along the guide hole 11a in the spindlehead casing 11. Being locked against axial displacement relative to the spindle sleeve 12 and gearbox 15 by the bearings 14, the sleeve 13 will travel jointly with the spindle sleeve out of the spindlehead casing 11.

It will be appreciated that the spindle 13 is rigidly supported by the spindle sleeve 12 throughout its complete length regardless of its axial position with respect to the spindlehead casing 11. So supported, the spindle 13 will not be strained under bending stresses that may be exerted therein during machining, such bending stresses being borne by the spindle sleeve 12 of greater rigidity. The deflection of the spindle 13 will be negligible, assuring utmost accuracy of machining. The increased rigidity of the spindle 13 with its sleeve 12 offers the additional advantage that larger cutting tools and attachments can be mounted to the spindle than could be heretofore. Still further, being restrained from axial deformation by the bearings 14, the spindle 13 is not to suffer elongation due to the heat that will develop during machining.

Despite the foregoing detailed disclosure, it is not desired that the invention be limited by the exact details of the illustrated embodiments. A variety of modifications, alterations and adaptations will suggest themselves to one skilled in the art. For example, the spindle sleeve may be of any cross sectional shape, instead of being tubular as in the illustrated embodiment, only if it has a hollow for rotatably receiving the spindle. All such changes within the usual knowledge of the specialists are considered to fall within the scope of the invention.

What is claimed is:

1. A spindlehead for a machine tool comprising:
  (a) a casing defining a linear guideway;
  (b) a spindle sleeve mounted to the casing for reciprocating movement out of and into the casing along the linear guideway;
  (c) a spindle rotatably mounted within the spindle sleeve and restrained from axial displacement relative to the same for joint axial movement with the spindle sleeve out of and into the casing;
  (d) fixed guide means mounted to the casing;
  (e) spindle drive means coupled to the spindle for imparting rotation thereto, the spindle drive means jointly reciprocating with the spindle and the spindle sleeve relative to the casing and having at least a portion slidably engaged with the guide means for linear displacement along the guideway; and
  (f) feed means mounted to the casing for linearly reciprocating the spindle and the spindle sleeve and the spindle drive means relative to the casing.

2. The spindlehead of claim 1, wherein the spindle drive means comprises:
  (a) a gearbox being slidably engaged with the guide means and mounted within the casing and constrained to linear displacement with the spindle and the spindle sleeve relative to the casing;
  (b) a drive motor mounted to the gearbox for joint linear displacement therewith; and
  (c) a geartrain within the gearbox for transmitting rotation of the drive motor to the spindle.

3. The spindlehead of claim 2 wherein the feed means comprises:
  (a) a feed motor mounted to the casing; and
  (b) motion-translating means for translating the rotation of the feed motor into the linear movement of the spindle and the spindle sleeve and the spindle drive means.

4. The spindlehead of claim 3 wherein the motion-translating means comprises:
  (a) a ball screw mounted to and driven by the feed motor; and
  (b) a ball nut mounted to the gearbox of the spindle drive means and operatively engaged with the screw.

* * * * *